United States Patent [19]

Kasting et al.

[11] 3,988,401
[45] Oct. 26, 1976

[54] COMPRESSION MOLDING OF THERMOPLASTIC MATERIAL

[75] Inventors: Howard Edward Kasting; Roger Brown Staub, both of Somerville, N.J.; Ward John Klingebiel, Charleston, W. Va.

[73] Assignee: Union Carbide Corporation, New York, N.Y.

[22] Filed: June 20, 1975

[21] Appl. No.: 588,846

Related U.S. Application Data

[63] Continuation-in-part of Ser. No. 391,671, Aug. 27, 1973, abandoned, which is a continuation-in-part of Ser. No. 149,566, June 3, 1971, abandoned.

[52] U.S. Cl. ............................ 264/37; 264/125; 264/140; 264/160; 264/175; 264/294; 264/349
[51] Int. Cl.² ................ B29C 29/00; B29D 7/14; B29F 5/00
[58] Field of Search ............ 264/37, 138, 140, 118, 264/322, 109, 117, 123, 124, 125, 126, 349, 160, 294

[56] References Cited
UNITED STATES PATENTS

| | | | |
|---|---|---|---|
| 2,485,128 | 10/1949 | Adams | 264/37 |
| 2,717,419 | 9/1955 | Dickey | 264/37 |
| 2,977,214 | 3/1961 | McLellan | 264/140 |
| 3,043,652 | 7/1962 | Schytil | 264/117 |
| 3,091,012 | 5/1963 | Bell | 264/140 |
| 3,114,930 | 12/1963 | Oldham et al. | 264/140 |
| 3,368,009 | 2/1968 | Oddi | 264/117 |
| 3,389,203 | 6/1968 | Merges et al. | 264/140 |

*Primary Examiner*—Willard E. Hoag
*Attorney, Agent, or Firm*—Gerald R. O'Brien

[57] ABSTRACT

A method is disclosed for the continuous molding of compressed bodies of thermoplastic material of uniform shape comprising feeding a thermally-softened stream of material to a rotary compression molding zone to form a sheet of interconnected compressed bodies, and disintegrating said sheet to form a plurality of compressed bodies of uniform shape.

3 Claims, 5 Drawing Figures

COMPRESSION MOLDING OF THERMOPLASTIC MATERIAL

This is a continuation-in-part of our copending patent application Ser. No. 391,671, filed Aug. 27, 1973 and entitled "Compacting of Thermoplastic Material" which is, in turn, a continuation-in-part of our patent application Ser. No. 149,566 filed June 3, 1971 and entitled "Compacting of Thermoplastic Material." Both prior applications are now abandoned.

The present invention relates to the compression molding of thermoplastic material and, more particularly, to the compression molding of synthetic organic thermoplastic materials.

Heretofore, thermoplastic materials in various particulate form have been pressure formed or compacted into denser bodies having a wide variety of shapes by a variety of methods. The compressed or compacted bodies provided the material in a more convenient form for handling and using. However, such bodies did present handling difficulties in that the material was friable and would often break, producing fines. Even when binders and reinforcing materials were incorporated, the strength of such material bodies left much to be desired.

Accordingly, it is the prime object of the present invention to provide a method for the production of stronger, more dense compressed or compacted bodies of thermoplastic material having improved dry flow characteristics.

Other aims and advantages of the invention will be apparent from the following description and appended claims.

As employed herein, the term "thermoplastic material" is understood to include all synthetic organic materials having thermoplastic characteristics. Certain synthetic organic resins, such as polyethylene and polyvinyl chloride, are widely recognized as possessing thermoplastic characteristics. Other resins, such as phenolic resins and those having high filler additions, are widely accepted as thermosetting resins. It is, however, to be noted that such resins do exhibit thermoplastic characteristics until they are reacted at a temperature and for a time sufficient to produce the cross-linking necessary to cause them to exhibit thermosetting characteristics. Therefore, it is to be understood that such uncross-linked thermosettable materials are to be regarded as thermoplastic materials within the scope of the present invention.

As employed herein, the term "thermally-softened stream of material" is understood to include all such uniform mixture material streams having at least about a 5 percent by weight component of the material heated to a temperature about the glass transition temperature (for amorphous materials) or to a temperature above the melting point (for crystalline materials). The component of the material stream is thermally softened prior to compression molding in order to act as a matrix or binding for the remainder of the stream of material. Upon molding, the compressed bodies formed have a strong integral construction with smooth cast or molded surfaces.

In the practice of the method of the present invention, virgin or previously untreated particulate thermoplastic homogeneous or heterogeneous material is continuously fed to a heating and mixing zone where it is processed to a thermally-softened stream which is continuously fed to the compression molding zone. In the compression molding zone, the stream is formed, in an operation similar to a continuous casting operation, into a continuous sheet of molded bodies which are interconnected by thin webs of material which passed through the interconnecting clearances of the compression molding zone.

The continuous sheet is then preferably cooled to a temperature below the softening point of the thermoplastic material, i.e., the glass transition temperature in the case of amorphous materials and the melting point in the case of crystalline materials.

The sheet is then passed continuously into a disintegration zone where it is broken into the plurality of component compressed bodies which form it. The compressed bodies are then separated from fines formed during the disintegration operation, the fines being recycled to the processing zone for reprocessing. Any course or oversize fraction, consisting of partially disintegrated product, may be recycled through the disintegration zone.

The heating and mixing step produces a uniform (well dispersed heterogenous mix) mixture of melted and unmelted component which is continuously fed to the continuous compression molding step to produce the continuous sheet of interconnected molded compressed bodies.

The heat required to be provided to the material stream in the heater-mixer may be either from an external heat source, such as electrical heater bands, or from that derived from the heat of friction generated within the apparatus by mechanical friction, or from both sources.

Figure 1:
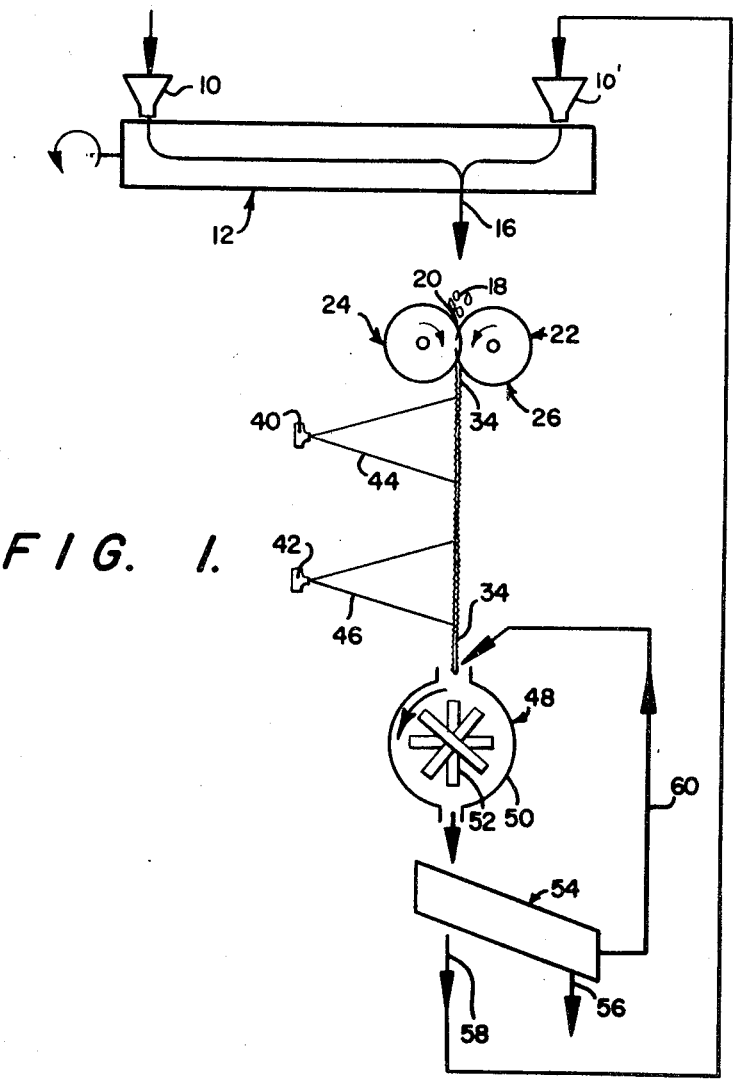
FIG. 1 is a schematic view of apparatus for use with the invention.

Referring specifically to the apparatus of the drawings, particulate thermoplastic material is fed to hopper 10 of heater-mixer 12 having either single- or multi-screw elements, kneading blocks and the like, as desired. The thermoplastic material is partially fluxed to a partially thermally-softened state and mixed in its passage through heater-mixer 12 and the homogeneous stream is continuously discharged from the heater-mixer through port 16.

The extrudate 18 passes as a continuous stream to the nip region 20 of rotary compactor 22 which comprises two sets of counter-rotating and cooperating rolls 24 and 26. Each set of cooperating rolls is composed of a plurality of axially adjacent discs alternately of greater and lesser diameter. Each disc is positioned so that each greater diameter disc 28 of one roll mates with a lesser diameter disc 30 of the other roll to form compression molding chambers between the surface of the lesser diameter discs 30 and recesses 32 on the periphery of the mating greater diameter discs 28.

As the stream of thermally-softened extrudate 18 is passed through the nip 20 across the width of the cooperative rolls 24 and 26 of rotary compression molding apparatus 22, a sheet of web of compactate 34 is produced. Compactate sheet 34 comprises a plurality of compressed bodies 36 each having the shape of the chamber formed by the mating between recesses 32 and the surfaces of discs 30.

Figure 4:
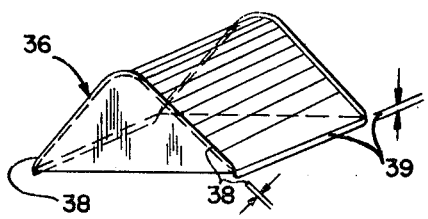
FIG. 4 is an oblique view of a compressed body obtainable from the practice of the invention.

As shown in FIG. 4 of the drawings, the compacted bodies 36 may have a triangular prismatic shape. It is to be understood, however, that the compactor bodies may have a side variety of other shapes, depending on the shape of the chamber formed by the mating roll discs.

Figure 2:
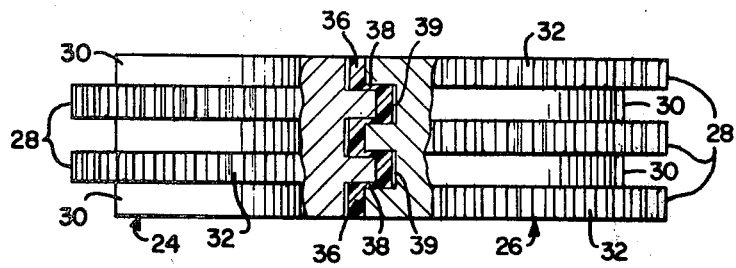
FIG. 2 is a plan view, partially broken away in section, of a rotary compression molding apparatus suitable for use in the embodiment of FIG. 1.
Figure 3:
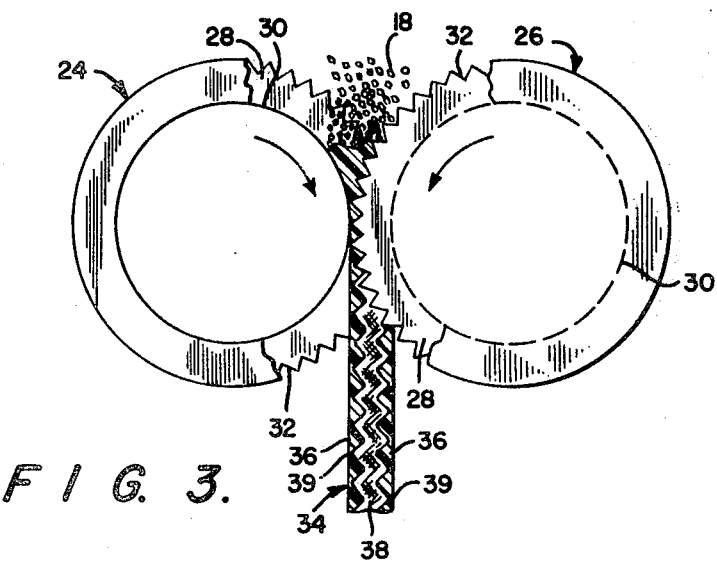
FIG. 3 is an elevational view, partially broken away, of the rotary compression molding apparatus of FIG. 2.

The interconnections between the component bodies 36 of the compactate sheet 34 is formed by thermoplastic material passed between the clearances of the rotating discs, as may be seen at points 38 and 39 in FIG. 2 of the drawings. It is important to provide such a suitable clearance to permit the maintenance of a compactate sheet, rather than a close clearance arrangement which would result merely in the production of a plurality of individual compacted bodies having no interconnections. Such an arrangement would make quite difficult the removal of individual compacted bodies from recesses 32 and surfaces 30.

The sheet 34 of interconnecting compacted bodies produced in rotary compression molding apparatus 22 is then preferably passed through cooling means, such as shown by aerated fluid spray means 40 and air cooling means 42 shown in FIG. 1. The spray means may project any cooling media sprays, such as shown at 44 and 46, which will assist in reducing the temperature of the sheet to below the softening point of the thermoplastic material.

It has been found preferable and beneficial that the compactate sheet be partially cooled subsequent to compacting and before disintegration. Such cooling permits disintegration of the sheet along the interconnecting material lines (similar to breaking along score lines), rather than any substantial fracture of the compacted bodies.

The continuous sheet 34 is then passed to rotary breaker means 48 which comprises a housing 50 and an internal plurality of rotary knife edges 52 which disintegrate the sheet against a bed knife (not shown) into the component compacted bodies 36, some fines and oversize, course material. The total disintegrated product is passed from the rotary breaker means 48 to classifier means 54, of the vibratory or cyclone type, which effects a separation of the component compacted bodies, the fines and the course fraction.

The finished compacted bodies are passed as product from classifier means through line 56. The fines are recycled to heater-mixer 12 through line 58, and the coarse fraction is recycled to the rotary breaker means through line 60.

The recycled fines are introduced through hopper 10′ to the short, reverse pitch section of the heater-mixer 12 where they are re-processed before admixture with the stream of virgin material discharged through outlet port 16 from the longer section of the heater-mixer from inlet hopper 10. The recycled fines are reprocessed in this time abbreviated manner, rather than to recycle them to the hopper 10 and pass them through the full heater-mixer operation, due to the retained effects of the original processing of the material.

Figure 5:
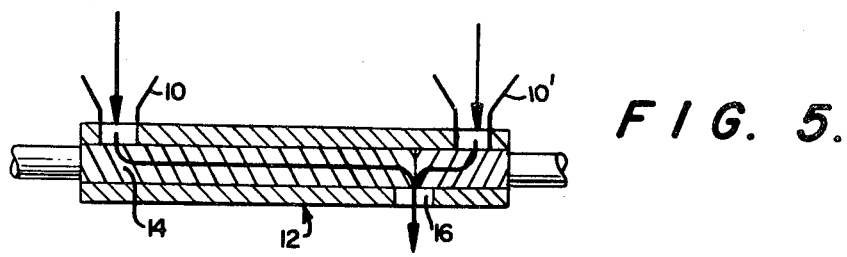
FIG. 5 is a schematic sectional view of alternative unitary processive apparatus suitable for use in the embodiment of FIG. 1.

In an example of the present invention, 1000 pounds per hour of phenolic resin (uncross-linked) mixture containing fillers, fibers, lubricants and the like, was continuously fed to the inlet hopper of a Werner and Pfleiderer ZSK 83 compounder, such as shown in FIGS. 1 and 5 of the drawings. The heating and mixing compounder has twin, corotating, intermeshing screws of 83 mm. diameter and a 1500 mm. compounding section from the inlet to outlet port. The twin screws employed were continuously driven at 285 rpm.

The extrudate was discharged continuously as a thermally-softened particulate stream at about 120° C. to the rotary compression molder nip.

The sheet of interconnected, molded component bodies was successively cooled (aerated water cooling spray followed by chilled air cooling spray) to a temperature of approximately 70° C.

The sheet was then fed to the breaking means (such as a Munson SCC-10 cutter sold by Munson Mill Machinery Co., Utica, N.Y.) to effect the continuous disintegration of the sheet into the bodies, fines and coarse fraction which were separated in classifier apparatus (such as Model 42 classifier of Orville-Simpson Co., Cincinnati, Ohio), whereupon the fines and coarse fraction were recycled as indicated hereinabove.

The individual molded bodies produced had smooth, cast surfaces and were uniformly of the general shape shown in FIG. 4 of the drawings. The base of the triangularly prismatic bodies was approximately 5 mm. × 5 mm. and the height of the prismatic body was approximately 2 mm.

It is to be noted that the individual bodies produced have slight projections 38 and 39 in the positions shown in FIG. 4 of the drawings. These slight projections are produced by the axial clearances 38 and radial clearances 39 within the compactor. The axial clearances are of the order of about 0.0005 to 0.030 inches and the radial clearances are of the order of 0.010 to 0.065 inches. The projections are respectively of smaller dimensions than the clearances which permitted their generation.

The compactor employed in the example was a 50 ton unit which had a 10.3 inch diameter by 5.5 inch working face rolls. Roll separating forces obtained varied in different runs over a range of from 300 to 36,000 pounds, depending upon many factors including the temperature and viscosity of the plastic material, filler employed, etc. Roll separating forces may also be set forth as ranging from about 50 to 7000 pounds per lineal inch of compactor roll bite width. Power demands of the compactor have been measured to range from between about 50 to 700 pounds per horsepower hour.

What is claimed is:

1. The method of making molded bodies of thermoplastic material of uniform shape from a mixture of particulate thermoplastic virgin material and recycled fines formed in the method comprising: feeding both virgin thermoplastic material and recycled fines to the same heatermixer, separately both heating said virgin material and reheating said fines in said heater-mixer, said recycled fines being reheated for a shorter time than said virgin material is heated, mixing said virgin material and said fines to form a mixture, continuously compressing said mixture to form a sheet of interconnected molded bodies; disintegrating said sheet to form a plurality of separate molded bodies of uniform shape and fines and recycling said fines to said reheating step.

2. The method for the continuous production of molded bodies of thermoplastic material of uniform shape from particulate thermoplastic material in accordance with claim 1, wherein a coarse, oversize fraction is also obtained in said disintegrating step, comprising the added step of recycling said coarse fraction to said disintegrating step.

3. The method of making molded bodies of uniform shape from a mixture of particulate virgin thermoplastic material and recycled thermoplastic fines formed in the method, comprising: feeding both virgin material and recycled fines to the same heater-mixer said heater-mixer having two separated heating and mixing zones, a first heating zone for said virgin material having a longer passage than the second zone for heating said fines, separately both heating said virgin material and reheating said fines in said heater-mixer, said recycled fines being reheated for a shorter time than said virgin material is heated, mixing said virgin material and said fines to form a mixture, continuously compressing said mixture to form a sheet of interconnected molded bodies; disintegrating said sheet to form a plurality of separate molded bodies of uniform shape and fines and recycling said fines to said reheating step.

* * * * *